(12) United States Patent
Kawai

(10) Patent No.: US 11,982,893 B2
(45) Date of Patent: May 14, 2024

(54) DISPLAY DEVICE

(71) Applicant: Japan Display Inc., Tokyo (JP)

(72) Inventor: Kentaro Kawai, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/314,839

(22) Filed: May 10, 2023

(65) Prior Publication Data

US 2023/0367164 A1    Nov. 16, 2023

(30) Foreign Application Priority Data

May 12, 2022   (JP) ................. 2022-079066

(51) Int. Cl.
*G02F 1/1333*   (2006.01)
*G02F 1/1335*   (2006.01)
*G02F 1/1345*   (2006.01)
*G02F 1/1362*   (2006.01)

(52) U.S. Cl.
CPC .. *G02F 1/133388* (2021.01); *G02F 1/133512* (2013.01); *G02F 1/1345* (2013.01); *G02F 1/13452* (2013.01); *G02F 1/136286* (2013.01); *G02F 1/136456* (2021.01); *G02F 1/136209* (2013.01)

(58) Field of Classification Search
None
See application file for complete search history.

(56) References Cited

U.S. PATENT DOCUMENTS

| 2017/0123249 | A1* | 5/2017 | Yoshida | G02F 1/136204 |
| 2022/0283462 | A1 | 9/2022 | Ohue | |
| 2023/0369349 | A1* | 11/2023 | Kawai | G02F 1/1345 |

FOREIGN PATENT DOCUMENTS

JP    2021-092748 A    6/2021

* cited by examiner

*Primary Examiner* — Dung T Nguyen
(74) *Attorney, Agent, or Firm* — XSENSUS LLP

(57) ABSTRACT

A display device includes an array substrate including a display region and a peripheral region, a counter substrate opposite to the array substrate, and a liquid crystal layer between the array substrate and the counter substrate. The display region includes a plurality of data signal lines and a plurality of scanning signal lines, the peripheral region includes a first wiring pattern arranged with a plurality of wirings connected to each of the plurality of scanning signal lines and a second wiring pattern applied with a certain potential, the first wiring pattern includes a first straight portion extending along the first direction, a second straight portion extending along the second direction, and a bending portion connecting the first straight portion and the second straight portion, and the bending portion includes a first wiring having a staircase-like stepped shape.

10 Claims, 14 Drawing Sheets

DISPLAY DEVICE

CROSS-REFERENCE TO RELATED APPLICATIONS

This application claims the benefit of priority to Japanese Patent Application No. 2022-079066, filed on May 12, 2022, the entire contents of which are incorporated herein by reference.

FIELD

An embodiment of the present invention relates to a wiring structure of a display device.

BACKGROUND

The following types of displays are known as liquid crystal displays (LCDs), transmissive displays, which display images by transmitting light from a backlight positioned behind a liquid crystal panel, reflective displays, which display images by reflecting outside light back to pixel electrodes, and semi-transmissive displays, which combine the features of both transmissive and reflective types of displays. These LCDs are used as displays in personal computers, smartphones, and other electronic devices. However, these LCDs have a configuration that does not allow the background to be viewed through the screen.

In contrast, transparent displays have been developed that allow the user to see through the background while displaying images. For example, a display device has been developed in which the display area is composed of a polymer-dispersed liquid crystal placed between a pair of translucent substrates, allowing the view behind to be transparent.

SUMMARY

A liquid crystal display device in an embodiment according to the present invention includes an array substrate including a display region with an array of pixels and a peripheral region outside the display region, a counter substrate opposite to the array substrate, and a liquid crystal layer between the array substrate and the counter substrate. The display region includes a plurality of data signal lines spaced apart in a first direction and a plurality of scanning signal lines spaced apart in a second direction intersecting the first direction. The peripheral region includes a first wiring pattern arranged with a plurality of wirings connected to each of the plurality of scanning signal lines and a second wiring pattern applied with a certain potential. The first wiring pattern includes a first straight portion extending along the first direction, a second straight portion extending along the second direction, and a bending portion connecting the first straight portion and the second straight portion, and the bending portion includes a first wiring having a staircase-like stepped shape. The second wiring pattern includes a second wiring having two-fold symmetry (180 degree rotation) with the first wiring. The first wiring pattern and the second wiring pattern have stepped contour portions formed by the bending portions in a plan view, and the contour portions are adjacent to each other in a relative manner.

DESCRIPTION OF EMBODIMENTS

Hereinafter, embodiments of the present invention are described with reference to the drawings. However, the present invention can be implemented in many different aspects, and should not be construed as being limited to the description of the following embodiment. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by A, B, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

First Embodiment

A display device 100 according to an embodiment of the present invention will be described with reference to the drawings.

1-1. Overview of Display Device

Figure 1:
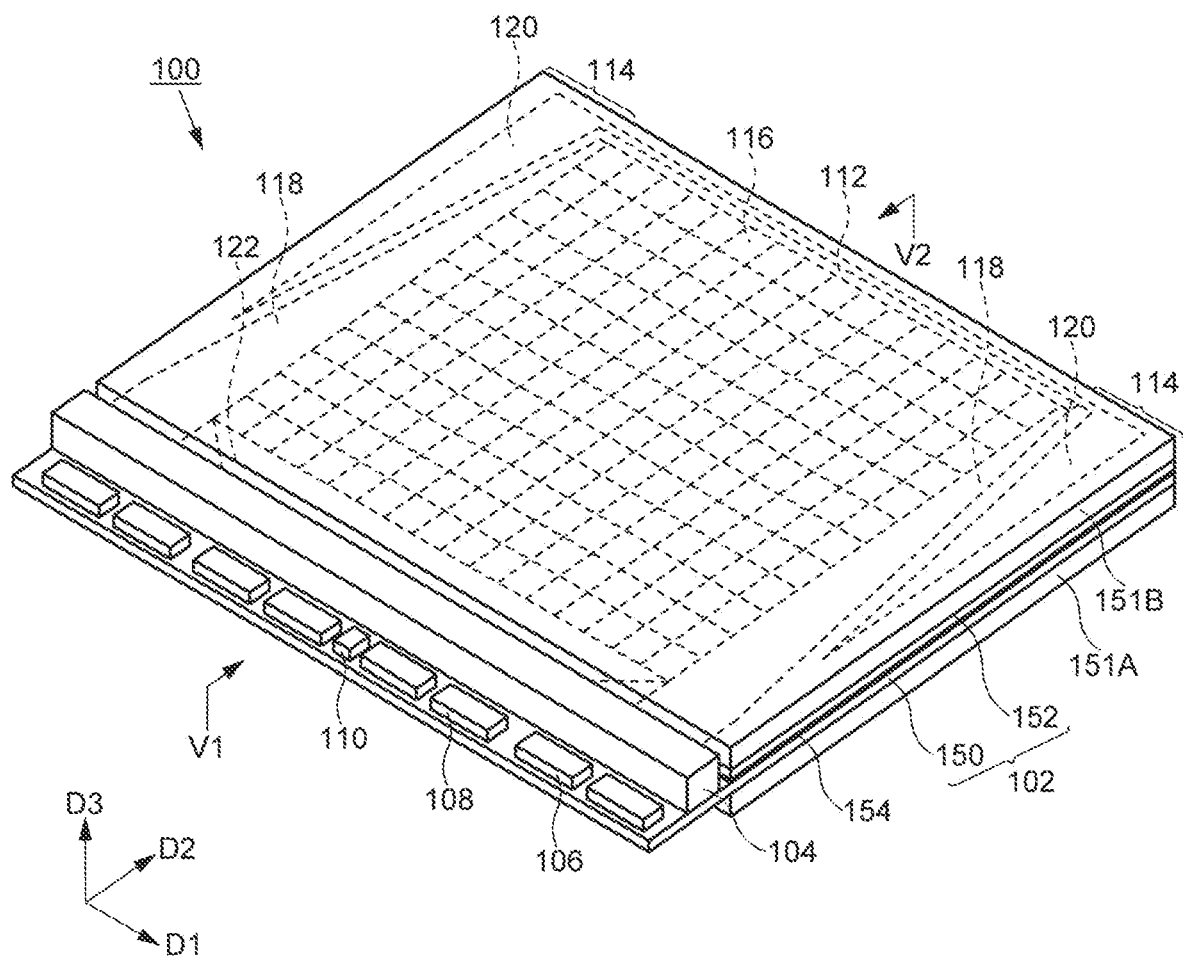
FIG. 1 shows a configuration of a display device according to an embodiment of the present invention.

FIG. 1 shows a diagram of a display device 100. The display device 100 includes a display panel 102, a light source 104, and a first transparent substrate 151A and a second transparent substrate 151B that sandwich the display panel 102. The display panel 102 includes an array substrate 150, a counter substrate 152, and a liquid crystal layer (not shown) between the array substrate 150 and the counter substrate 152, a scanning signal line drive circuit 106, and a data signal line drive circuit 108. In the following description referring to FIG. 1, one direction of the plane in the display panel 102 is a direction D1, the direction orthogonal to the direction D1 is a direction D2, and the direction orthogonal to the D1-D2 plane is a direction D3.

The array substrate 150 and the counter substrate 152 are translucent. The array substrate 150 and the counter substrate 152 have transmissivity. The array substrate 150 and the counter substrate 152 are preferably transparent to visible light. The counter substrate 152 is opposite the array substrate 150 and is disposed in the direction D3. The array substrate 150 and the counter substrate 152 are disposed opposite each other with a gap between them and are attached together by a sealant 154. The liquid crystal layer which is not shown is disposed in the gap between the array substrate 150 and the counter substrate 152.

The display panel 102 has a display region 112 and a peripheral region 114 outside the display region 112. A plurality of pixels 116 are arranged in the display region 112 in the row and column directions. Here, the row direction refers to the direction parallel to the direction D1, and the column direction refers to the direction parallel to the direction D2. The display region 112 has m pixels arranged in the row direction and n pixels arranged in the column direction. The values of m and n are then set appropriately according to the vertical and horizontal display resolutions. The display region 112 is disposed with scanning signal lines in the direction D1 and data signal lines in the direction D2.

In the peripheral region 114 of the array substrate 150, a scanning signal line drive circuit 106 and a data signal line drive circuit 108 are arranged. FIG. 1 shows how the scanning signal line drive circuit 106 and the data signal line drive circuit 108 are provided in an integrated circuit (IC), and the integrated circuit (IC) is mounted on the array substrate 150 in a COG (Chip on Glass) method. The scanning signal line drive circuit 106 and the data signal line drive circuit 108 are not limited to the method shown in the figure, and may be implemented using the COF (Chip on Film) method or formed by thin film transistors (TFTs) on the array substrate 150.

A first wiring pattern 118, a second wiring pattern 120, and a third wiring pattern 122 are disposed in the peripheral region 114. The first wiring pattern 118 is a pattern formed by wiring that connects the scanning signal line drive circuit 106 and the scanning signal lines 107 that are arranged in the display region 112. The second wiring pattern 120 is a pattern formed by the common wiring. The second wiring pattern 120 is circuitry used as wiring to apply a common voltage to the counter electrode 162 (refer to FIG. 6) disposed on the counter substrate 152. The third wiring pattern 122 is a pattern formed by wiring connecting the data signal line drive circuit 108 and the data signal lines 109 disposed in the display region 112.

The light source 104 has a structure along the direction D1. The light source 104 for example, is configured with light-emitting diodes (LEDs) arrayed along the direction D1. The detailed structure of the light source 104 is not limited and may include optical components such as reflectors, diffusers, and lenses in addition to the light emitting diodes arrayed in the direction D1. The light source 104 and a light emission control circuit 110 that controls the light source 104 may be provided as a separate component independent of the display panel 102. The timing of light emission of the light source 104 may be controlled by the light emission control circuit 110 that is synchronized with the scanning signal line drive circuit 106 and the data signal line drive circuit 108. The light emission control circuit 110 that controls the light source 104 may be provided as a separate component from the display panel 102, the same as the light source 104. The light emission control circuit 110 may be mounted on the array substrate 150 as a separate component. The light emission control circuit 110 may be incorporated into the scanning signal line drive circuit 106 or the data signal line drive circuit 108.

The first transparent substrate 151A and the second transparent substrate 151B are disposed between the display region 112 and the peripheral region 114. The first transparent substrate 151A and the second transparent substrate 151B function as protective members for the display panel 102. As will be explained with reference to FIG. 2, the first transparent substrate 151A and the second transparent substrate 151B function as light guide plates that introduce light emitted from the light source 104 into the display panel 102.

Figure 2:
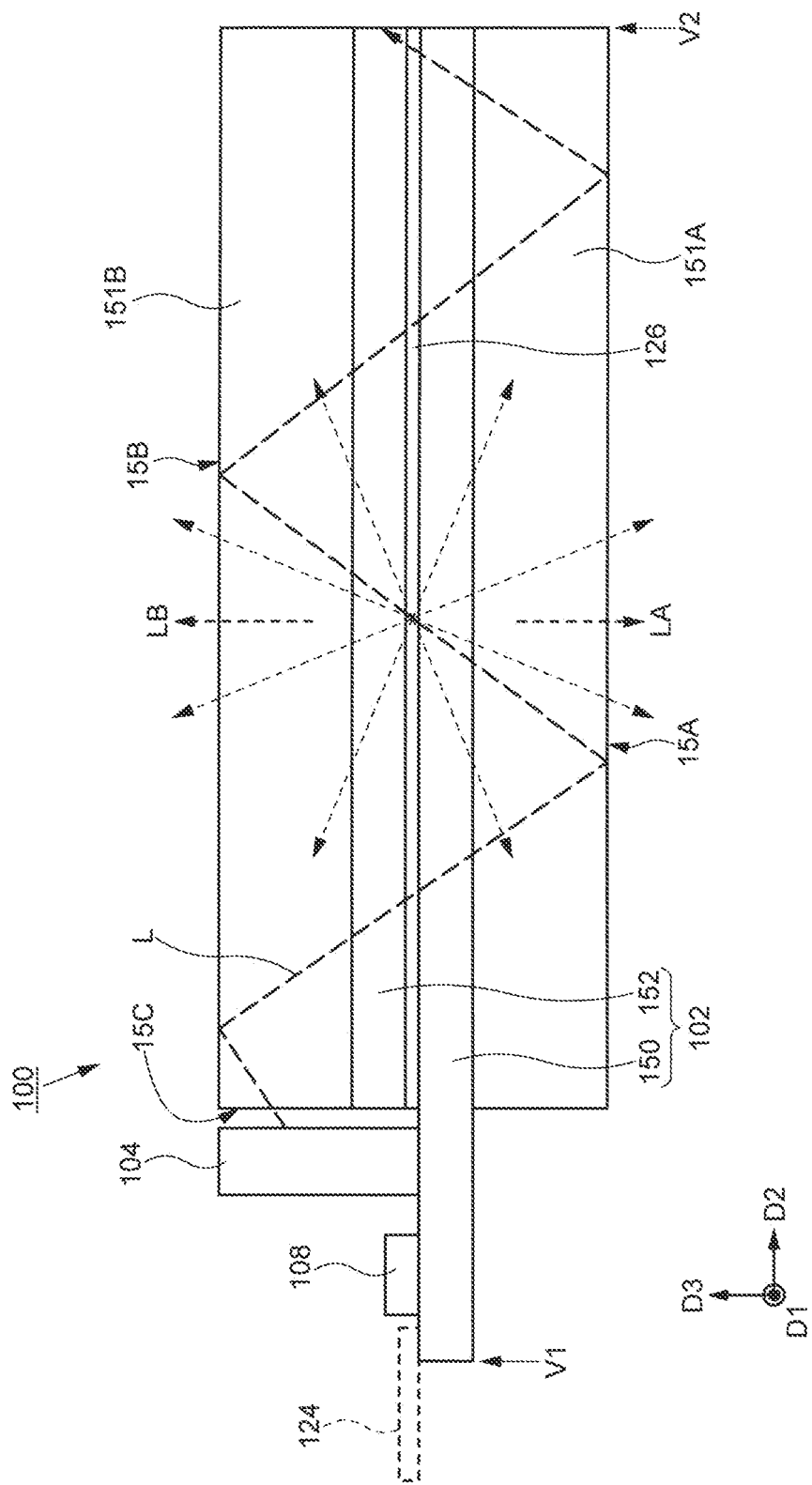
FIG. 2 is a cross-sectional schematic diagram showing the structure corresponding to the region between V1-V2 of the display device shown in FIG. 1.

FIG. 2 shows a cross-sectional structure of the display device 100 corresponding to the region between V1 to V2 shown in FIG. 1. As shown in FIG. 2, a first transparent substrate 151A is disposed on the array substrate 150 side of the display panel 102, and a second transparent substrate 151B is disposed on the counter substrate 152 side of the display panel 102. The first transparent substrate 151A and the second transparent substrate 151B are glass or plastic substrates. The first transparent substrate 151A and the second transparent substrate 151B preferably have the same refractive index as the array substrate 150 and the counter substrate 152. The array substrate 150 and the first transparent substrate 151A and the counter substrate 152 and the second transparent substrate 151B are bonded with a transparent adhesive not shown.

The display panel 102 is disposed so that the array substrate 150 and the counter substrate 152 are facing each other, and the liquid crystal layer 126 is disposed between the array substrate 150 and the counter substrate 152. The array substrate 150 is larger than the counter substrate 152 and is sized such that a portion of the peripheral region 114 is exposed from the counter substrate 152. The array substrate 150 is mounted with the drive circuit (in FIG. 2, the data signal line drive circuit 108). A flexible wiring substrate 124 is mounted on the periphery of the array substrate 150.

The light source 104 is disposed adjacent to one side of the first transparent substrate 151A or the second transparent substrate 151B. FIG. 2 shows a configuration in which the light source 104 is disposed along one side of the second transparent substrate 151B. FIG. 2 also shows a configuration in which the light source 104 is mounted on the first substrate 150, but there is no limitation on the configuration in which the light source 104 is disposed, and there is no limitation on the mounting structure as long as the mounting position can be fixed. The light source 104 may be supported, for example, by an enclosure surrounding the display panel 102.

As shown in FIG. 2, the light source 104 is disposed along the first side 15C of the second transparent substrate 151B. As shown in FIG. 2, the light source 104 emits light L to the first side 15C of the second transparent substrate 151B. The light source 104 is sometimes referred to as a side light source because it emits light L toward the first side 15C. The first side 15C of the second transparent substrate 151B facing the light source 104 is the light-entering surface.

As shown schematically in FIG. 2, light L incident from the first side 15C of the second transparent substrate 151B propagates in the direction away from the first side 15C (direction D2) while being reflected by the first plane 15B of the second transparent substrate 151B and the first plane 15A of the first transparent substrate 151A. When light L passes outward from the first plane 15A of the first transparent substrate 151A and the first plane 15B of the second transparent substrate 151B, it will proceed from a medium with a large refractive index to a medium with a small refractive index. If the angle of incidence of light L incident on the first plane 15A and the second plane 15B is larger than the critical angle, the light will be totally reflected and will be guided in the direction D2 while being reflected by the first plane 15A and the second plane 15B.

The liquid crystal layer 126 is formed of a polymer-dispersed liquid crystal. The liquid crystal layer 126, which is formed of a polymer-dispersive liquid crystal, has a controlled scattering state and a non-scattering state for each pixel 116 (refer to FIG. 1). As shown in FIG. 2, light L that propagates while reflecting between the first plane 15A and second plane 15B is scattered at least partially when there is a pixel where the liquid crystal layer 126 is in a scattering state, when the incident angle of the scattered light is smaller than the critical angle, the scattered light LA and LB are emitted outward from the first plane 15A and the second plane 15B, respectively, and the scattered light LA and LB emitted externally are observed by an observer. In the display region of the display panel 102, other than where the scattered light LA and LB are emitted, an observer can view the rear side through the display panel 102, since the array substrate 150 and the counter substrate 152, the first transparent substrate 151A and the second transparent substrate 151B are transparent (transparent to visible light) and since the liquid crystal layer 126 is in a non-scattering state, it is substantially transparent.

1-2. Configuration of Array Substrate

Figure 3:
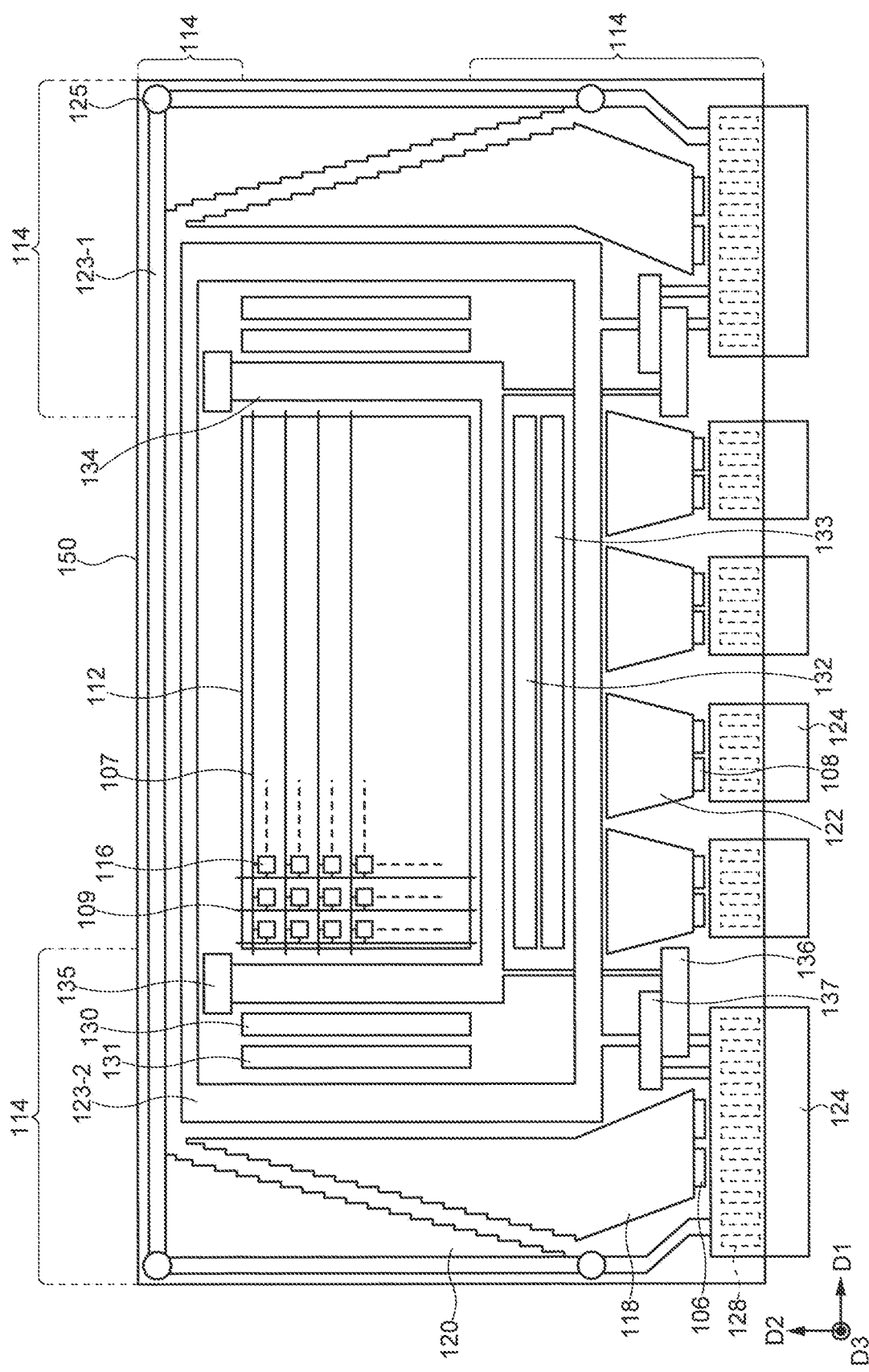
FIG. 3 is a configuration of an array substrate of a display device according to an embodiment of the present invention.

FIG. 3 is a plan view of the array substrate 150. As shown in FIG. 3, the array substrate 150 includes the display region 112 and the peripheral region 114. As described with reference to FIG. 1, the display region 112 has the plurality of pixels 116 disposed in a matrix. The display region 112 is disposed of the scanning signal lines 107, which extend in the direction D1 and are arranged in the direction D2, and the data signal lines 109, which extend in the direction D2 and are arranged in the direction D1. Although not shown in the figure, each of the plurality of pixels 116 includes a pixel electrode, a transistor connected to the pixel electrode, an opposing electrode, and a liquid crystal layer.

The peripheral region 114 is the region outside of the display region 112 and also surrounds the display region 112. The peripheral region 114 can also be described as the region on the array substrate 150 from the display region 112 to the edge of the array substrate 150.

The peripheral region 114 is disposed with the scanning signal line drive circuit 106 and the data signal line drive circuit 108. The first wiring pattern 118 extending from the scanning signal line drive circuit 106 to the display region 112, the second wiring pattern 120 formed by common wiring, and the third wiring pattern 122 extending from the data signal line drive circuit 108 to the display region 112 are disposed in the peripheral region 114.

In addition to these, common wirings 123-1, 123-2, common pads 125, and a scanning signal line inspection circuit 130, a data signal line inspection circuit 132, and terminals 128 for inputting signals from external circuits are arranged in the peripheral region 114. The terminals 128 are disposed along the direction D1, for example, at the periphery of the array substrate 150. The flexible wiring substrate 124 is attached to the terminals 128.

The flexible wiring substrate 124 is electrically connected to the scanning signal line drive circuit 106, common wirings 123-1, 123-2, ESD protection circuit 137, and QD pad 136. The scanning signal line drive circuit 106 is connected to the plurality of scanning signal lines 107 via the first wiring pattern 118. Each of the plurality of scanning signal lines 107 is electrically connected to each of the plurality of pixels 116 in the display region 112. The number of routed wirings forming the first wiring pattern 118 corresponds to the number of scanning signal lines 107 connected to the scanning signal line drive circuit 106. Although the first wiring pattern 118 is shown in FIG. 3 as being disposed in isolation from the display region 112, it is actually continuous so as to be connected to the scanning signal lines 107.

The wiring group forming the first wiring pattern 118 is arranged with the scanning signal lines 107 equally spaced in the direction D2, so that the number of wirings becomes larger on the side closer to the scanning signal line drive circuit 106 and smaller as it moves away from the scanning signal line drive circuit 106. Correspondingly, a width of the first wiring pattern 118 is wider on the side closer to the scanning signal line drive circuit 106 and narrows as it moves away from it. A width of the second wiring pattern 120 is wider on the side farther from the scanning signal line drive circuit 106 and narrows as it gets closer, so as to fill the area where the first wiring pattern 118 is not formed. In this way, the first wiring pattern 118 and the second wiring pattern 120 have complementary shapes, so that the left and right areas across the display region 112 can be filled with wiring patterns. As will be described later, the first wiring pattern 118 and the second wiring pattern 120 have a periodic wiring pattern similar to that of the display region 112, so that the boundary between the display region 112 and the peripheral region 114 will be difficult to identify.

The flexible wiring substrate 124 supplies video signals to the data signal line drive circuit 108. The data signal line drive circuit 108 is connected to the plurality of data signal lines 109. Each of the plurality of data signal lines 109 is electrically connected to each of the plurality of pixels 116 in the display region 112. The third wiring pattern 122 connecting the data signal line drive circuit 108 to the plurality of data signal lines 109 is represented in FIG. 3 as being disposed at a distance from the display region 112, but is continuous so as to be connected to the data signal lines 109.

The common wiring 123, ESD protection circuit 131, scanning signal line inspection circuit 130, and inspection line 134 are disposed between the first wiring pattern 118 and the display region 112. The common wiring 123, ESD protection circuit 133, data signal line inspection circuit 132, and inspection line 134 are disposed between the third wiring pattern 122 and the display region 112. The inspection line 134 is connected to the ESD protection circuit 135 and the QD pad 136. The common wiring 123 is connected to the ESD protection circuit 137. The common wiring 123-1 is disposed to surround the peripheral region 114 on the array substrate 150, and signals are supplied from the flexible wiring substrate 124. The common wiring 123-1 is connected to the second wiring pattern 120.

1-3. Configuration of Counter Substrate

Figure 4:
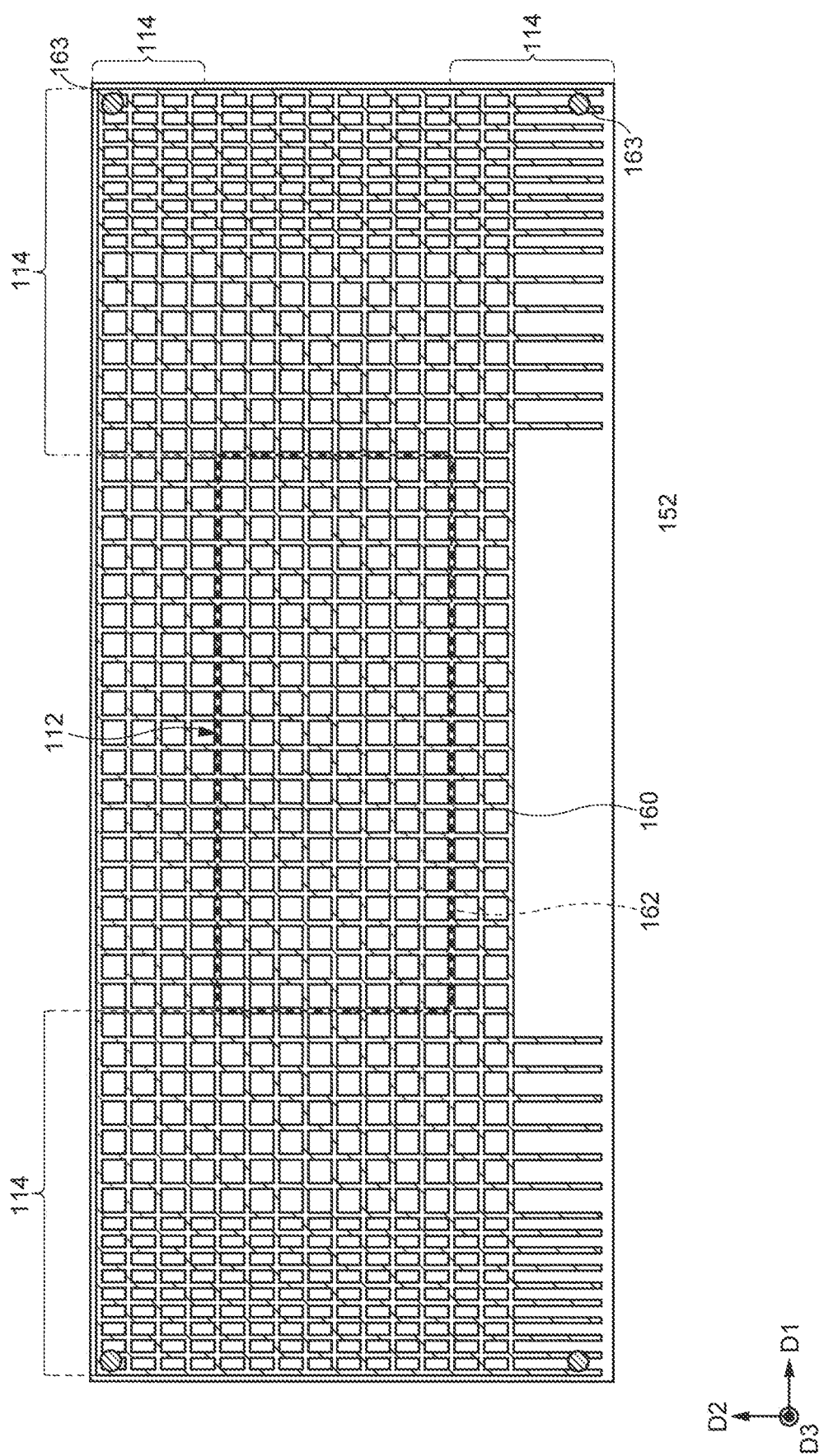
FIG. 4 is a plan view of the light shielding layer in a display device according to an embodiment of the present invention.

FIG. 4 is a plan view of the configuration of the counter substrate 152. As shown in FIG. 4, a light shielding layer 160 and the counter electrode 162 are disposed on the counter substrate 152. The light shielding layer 160 is disposed in the display region 112 and the peripheral region 114. The counter electrode 162 is disposed in the display region 112. The counter electrode 162 may be disposed to extend not only to the display region 112 but also to the peripheral region 114.

The light shielding layer 160 has a first grid pattern that overlaps the scanning signal lines 107 and data signal lines 109 in the display region 112. In other words, the light shielding layer 160 has a pattern that opens the region of the pixel 116 which is a transparent region and masks the region overlapping the wiring where transmitted light is shielded. Since the pixels 116 are periodically arranged in a matrix-like pattern in the display region 112, the light shielding layer 160 also has a periodic pattern in the form of a grid.

The light shielding layer 160 has a second grid pattern in the peripheral region 114. The light shielding layer 160 has a continuous first grid pattern and a second grid pattern from the display region 112 to the peripheral region 114, so that no large difference in aperture ratio can be observed. Thereby, the boundary between the display region 112 and the peripheral region 114 can be made less visible and no difference in transparency can be produced.

The light shielding layer 160 can be formed of black resin or a metal material. The light shielding layer 160 is formed in contact with the counter electrode 162 (refer to FIG. 6). The light shielding layer 160 can function as an auxiliary electrode to reduce resistance loss by forming the light shielding layer 160 with a metal material in contrast to the counter electrode 162, which is formed with a transparent conductive film. As a metal material to form the light shielding layer 160, it is preferable to use chromium, molybdenum, titanium, etc., which have relatively low reflectivity compared to aluminum.

Common pads 163 are disposed on the counter substrate 152. The common pads 163 are formed in the same layer as the light shielding layer 160 and are disposed to conduct with the light shielding layer 160. The common pads 163 are located in a position overlapping the common pads 125 of the array substrate 150. The display panel 102 is cell assembled so that the common pads 125 on the array substrate 150 side and the common pads 163 on the counter substrate 152 side are conductive. As a result, a common voltage is applied from the array substrate 150 to the counter electrode 162. The common pads 125, 163 are disposed at the periphery of the panel. The light shielding layer 160 functions as wiring connecting the common pad 163 and the opposing electrode 162. It is possible to reduce the wiring resistance since the light shielding layer 160 has a second grid pattern.

Figure 5:
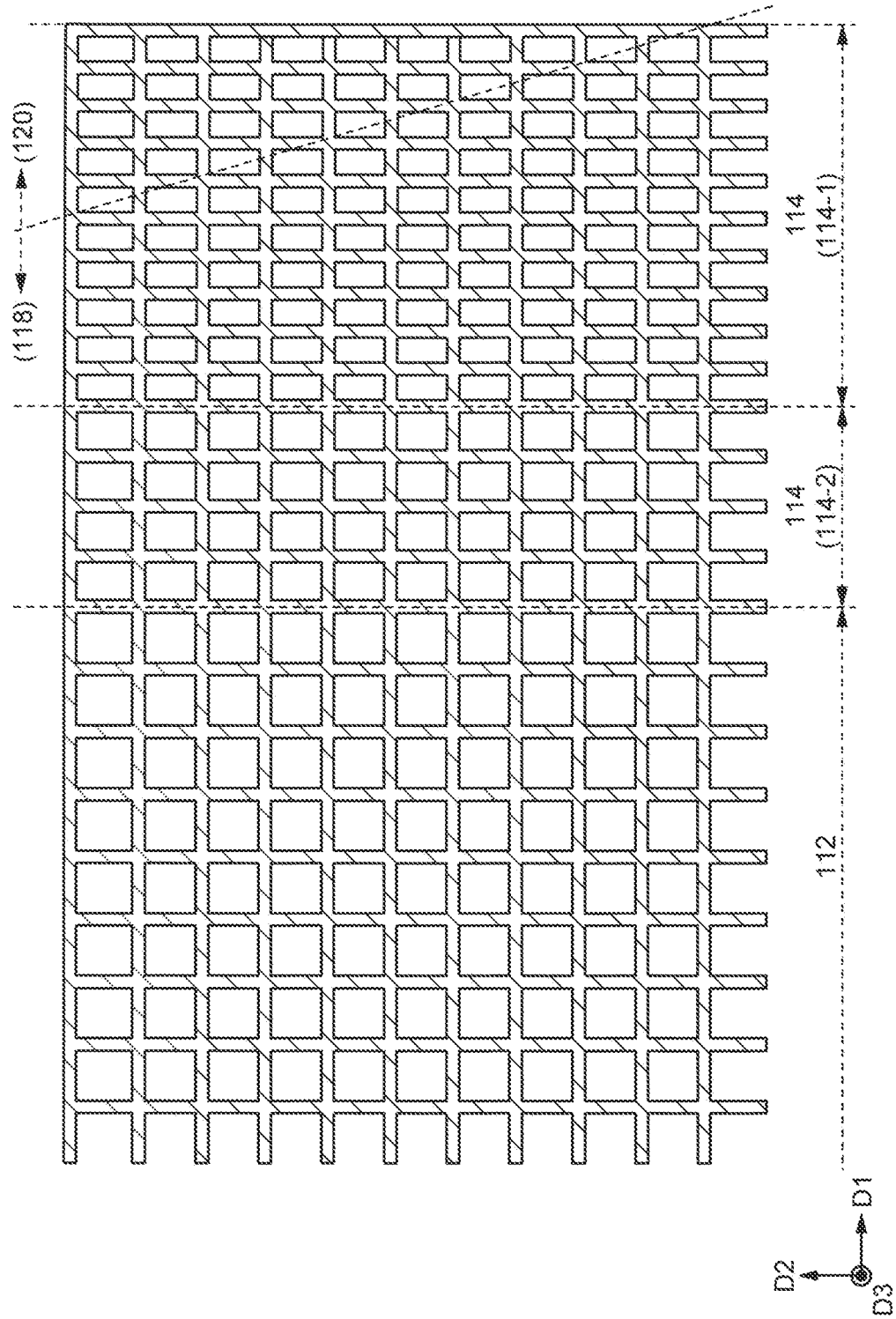
FIG. 5 is a plan view of the light shielding layer in a display device according to an embodiment of the present invention.

FIG. 5 is a detail of the pattern of the light shielding layer 160, which is continuously arranged from the display region 112 to the peripheral region 114. The light shielding layer 160 has a first grid pattern in the display region 112, overlapping the scanning signal lines 107 and the data signal lines 109. As described in FIG. 3, the scanning signal lines 107 are arranged at constant intervals in the direction D2, and the data signal lines 109 are arranged at constant intervals in the direction D1. In accordance with this, the light shielding layer 160 disposed in the display region 112 also has a periodic first grid pattern formed by intersecting linear patterns extending in the directions D1 and D2.

The peripheral region 114 includes an inspection circuit region 114-2 where the scanning signal line inspection circuit 130 is disposed, and a wiring region 114-1 where the first wiring pattern 118 and the second wiring pattern 120 are disposed. In the wiring region 114-1, routed wirings that connect the scanning signal line drive circuit 106 and the scanning signal line 107 are densely arranged as the first wiring pattern 118. The common wirings are disposed in the same pattern as the routed wirings as the second wiring pattern 120. The second grid pattern of the light shielding layer 160 in this region has a smaller pitch than the first grid pattern of the light shielding layer 160 in the display region 112 so as to shield these routed wirings and common wiring. The pattern pitch of the light shielding layer 160 in the inspection circuit region 114-2, which is disposed between the display region 112 and the wiring region 114-1, is designed so that the pattern pitch of the light shielding layer 160 is intermediate with respect to the pattern pitch of the light shielding layer 160 in the display region 112 and the wiring region 114-1. That is, the pitch of the grid pattern of the light shielding layer 160 is smaller in the order of display region 112, inspection circuit region 114-2, and wiring region 114-1. Such a grid pattern can make the boundary between the display region 112 and the peripheral region 114 less visible, so that the observer does not feel uncomfortable.

1-4. Cross-Sectional Structure of Pixel

Figure 6:
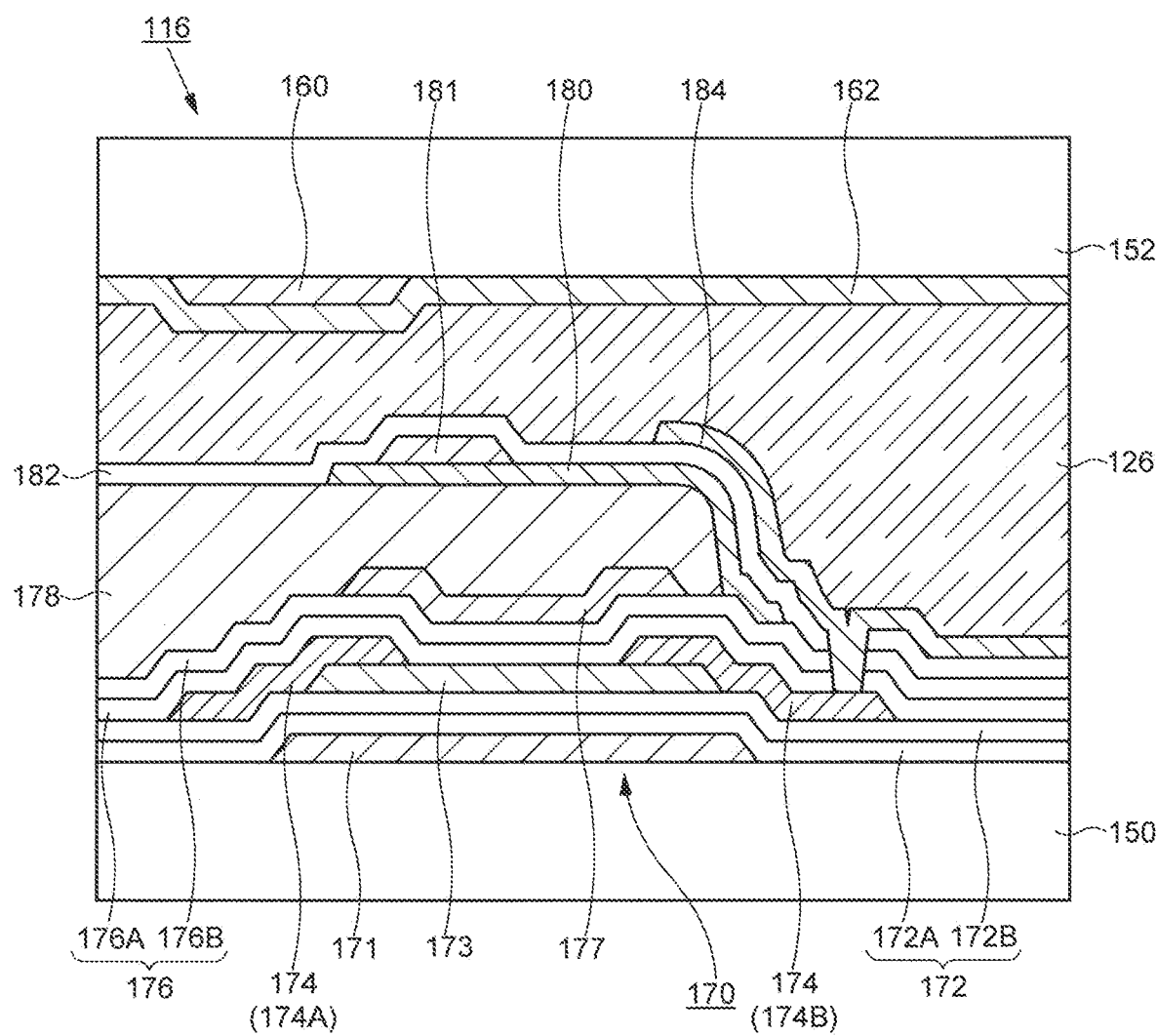
FIG. 6 is a cross sectional view of a structure of a pixel in a display device according to an embodiment of the invention.

FIG. 6 shows the cross-sectional structure of the pixel 116. As shown in FIG. 6, a transistor 170 is provided on the array substrate 150. The transistor 170 includes a first conductive layer 171 as a gate electrode, a first insulating layer 172, a semiconductor layer 173, and a second conductive layer 174 forming a source electrode 174A and a drain electrode 174B. The first insulating layer 172 is interposed between the first conductive layer 171 and the semiconductor layer 173 and functions as a gate insulating layer. The semiconductor layer 173 is formed of, for example, an oxide semiconductor. The source electrode 174A is connected to the data signal line 109, and the drain electrode 174B is connected to the second transparent conductive layer 184 as the pixel electrode. The first conductive layer 171 is formed by the same layer as the conductive layer forming the scanning signal line 107, and the source electrode 174A and drain electrode 174B are formed by the conductive layer forming the data signal line 109. The first insulating layer 172 may have a single-layer structure or may have a structure in which multiple insulating layers are stacked. For example, the first insulating layer 172 may have a structure in which a silicon nitride layer 172A and a silicon oxide layer 172B are stacked.

FIG. 6 shows an example of a bottom-gate type (also called reverse staggered) structure in which the transistor 170 has the first conductive layer 171 as the gate electrode, the first insulating layer 172 as the gate insulating layer, and the semiconductor layer 173 stacked from the side of the array substrate 150, and the source electrode 174A and drain electrode 174B are disposed across the semiconductor layer 173. The transistor 170 that can be used in pixel 116 is not limited to the structure shown in FIG. 6, and a top-gate type structure can also be applied.

A second insulating layer 176 is disposed over the transistor 170. The second insulating layer 176 is arranged as a passivation layer. The second insulating layer 176 may have a single-layer structure or may have a structure in which multiple insulating layers are stacked. For example, the second insulating layer 176 may have a structure in which a silicon oxide layer 176A and a silicon nitride layer 176B are stacked. A third conductive layer 177 may be disposed on the second insulating layer 176 in the region overlapping the semiconductor layer 173. The third conductive layer 177 is used as a light shielding layer for the semiconductor layer 173 and is used as a back gate electrode when a certain potential is applied.

A planarization layer 178 is disposed on the second insulating layer 176 and the third conductive layer 177. The planarization layer 178 is an organic insulating layer made of an organic material such as acrylic. The planarization layer 178 is disposed to mitigate unevenness caused by various components such as the first conductive layer 171, semiconductor layer 173, source electrode 174A, and drain electrode 174B that constitute the transistor 170. When the display device 100 is a transparent display, the planarization layer 178 may be removed in the aperture region of the pixel 116 to increase transparency. This structure reduces light absorption by the planarization layer 178 in the aperture region and increases transparency. FIG. 6 shows a structure in which the planarization layer 178 is disposed in the region overlapping the transistor 170 and the planarization layer 178 is removed in the region outside the transistor 170. The second insulating layer 176 is exposed from the planarization layer 178 in the region outside the transistor 170.

As shown in FIG. 6, a first transparent conductive layer 180 is disposed from the top of the planarization layer 178 to the side surface (the stepped portion where the planarization layer 178 has been removed). A fourth conductive layer 181 is disposed in a part of the area above the first transparent conductive layer 180. The first transparent conductive layer 180 is used as a capacitance electrode and the fourth conductive layer 181 is used as a capacitance wiring. A third insulating layer 182, which is an inorganic insulating layer composed of an inorganic material such as silicon nitride, is disposed to cover the first transparent conductive layer 180 and the fourth conductive layer 181 and to cover the planarization layer 178 and the second insulating layer 176 that is exposed from the planarization layer 178. A second transparent conductive layer 184 is disposed over the third insulating layer 182. The second transparent conductive layer 184 is disposed so that it extends over the area where the planarization layer 178 has been removed and overlaps the first transparent conductive layer 180 in a part of the area through the third insulating layer 182. The second transparent conductive layer 184 forms a pixel electrode. The second transparent conductive layer 184 as the pixel electrode is connected to the drain electrode 174B through a contact hole formed in the second insulating layer 176. A holding capacitance is formed in the region where the second transparent conductive layer 184 and the first transparent conductive layer 180 overlap through the third insulating layer 182.

The counter substrate 152 is disposed opposite the array substrate 150. The light shielding layer 160 and the counter electrode 162 are disposed on the counter substrate 152. FIG. 6 shows a structure in which the light shielding layer 160 is disposed, for example, in the region overlapping the source electrode 174A (data signal line 109). The counter electrode 162 has a size that extends over the entire surface of the display region 112. The light shielding layer 160 may be formed of a metal film as described above. The light shielding layer 160 is disposed in contact with the counter electrode 162, which is formed of a transparent conductive layer, and thus functions as an auxiliary electrode.

The liquid crystal layer 126 is disposed between the array substrate 150 and the counter substrate 152. The liquid crystal layer 126 is formed of a polymer dispersion liquid crystal. The polymer dispersion liquid crystal can be applied in either a normal mode, in which it changes from a scattering state to a non-scattering state (transparent), or a reverse mode, in which it changes from a non-scattering state (transparent) to a scattering state, depending on the state in which a voltage is applied to the second transparent conductive layer 184 as the pixel electrode. Since the polymer dispersion liquid crystal does not require a polarizing plate, the display panel 102 can be seen through in the non-scattered state (transparent), allowing the back side to be viewed.

1-5. Wiring Pattern Next, FIG. 7A, FIG. 7B, and FIG. 7C are referenced to explain the details of the first wiring pattern 118 and the second wiring pattern 120.

Figure 7A:
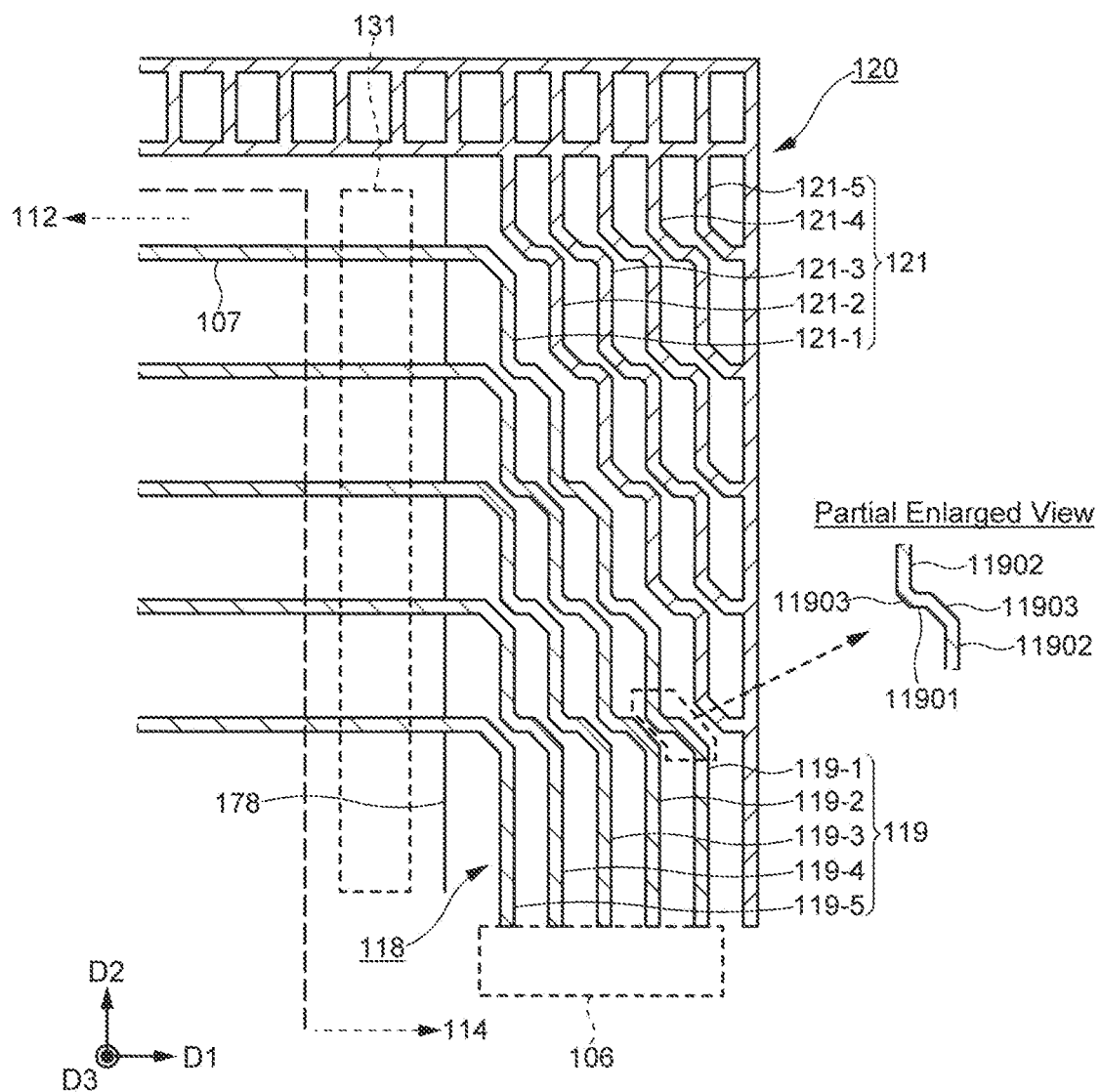
FIG. 7A is a plan view showing a configuration of wiring disposed in a peripheral region of a display device according to an embodiment of the present invention.
Figure 7B:
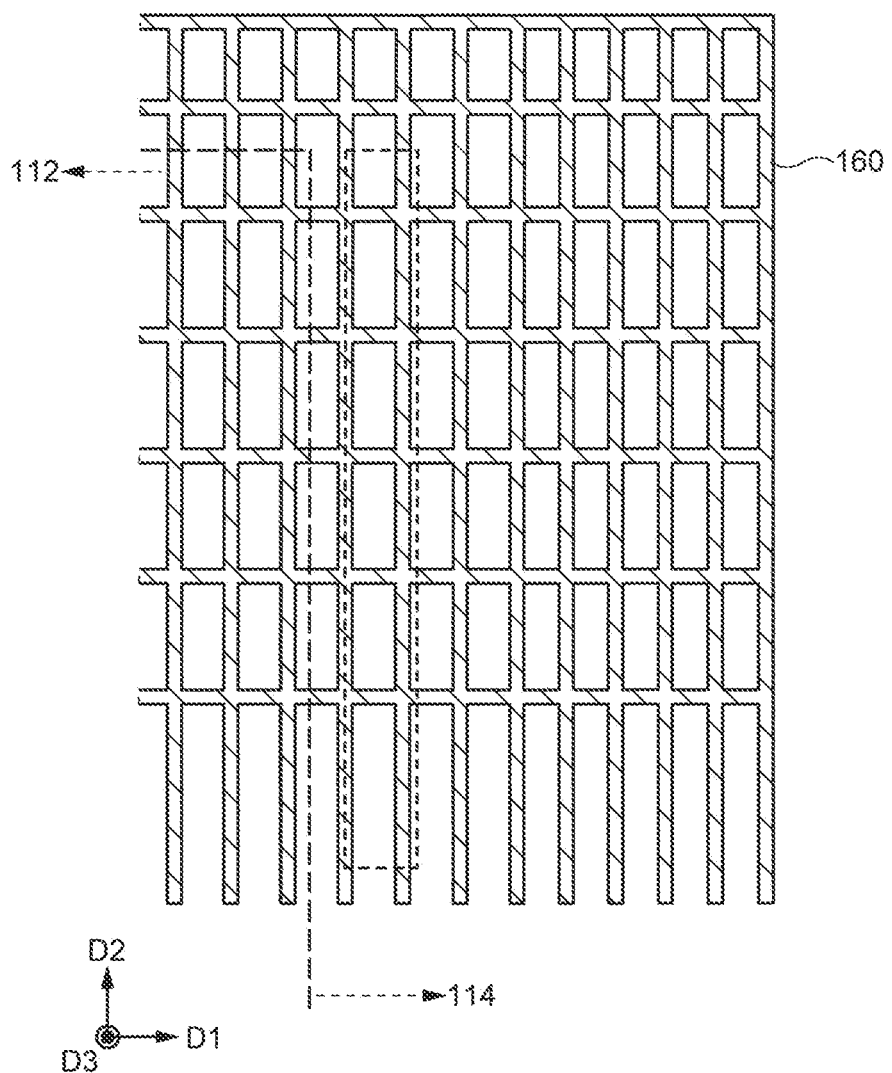
FIG. 7B is a cross-sectional view showing a configuration of a light shielding layer disposed in a peripheral region of a display device according to an embodiment of the present invention.
Figure 7C:
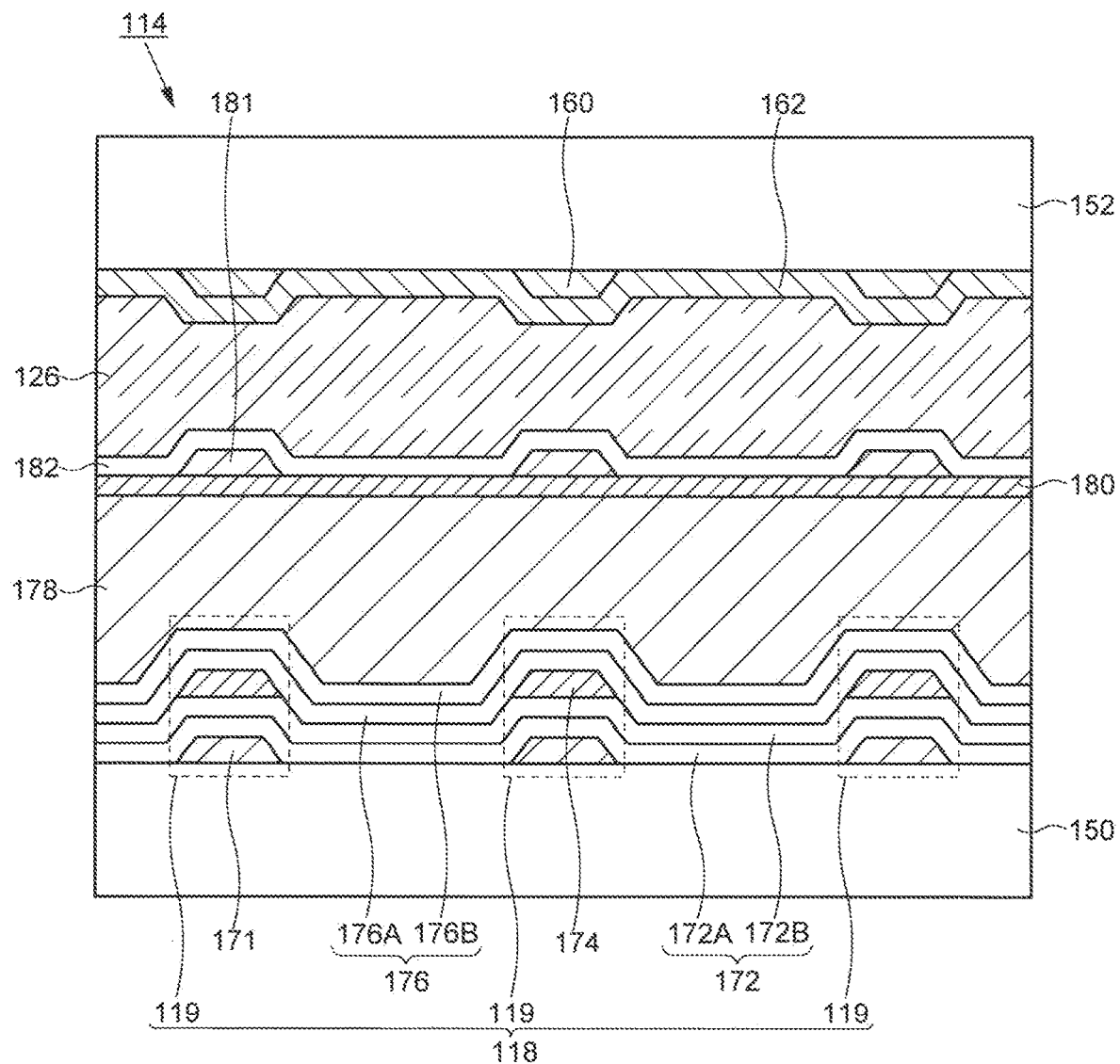
FIG. 7C is a cross-sectional view showing a configuration of wiring and a light shielding layer disposed in a peripheral region of a display device according to an embodiment of the present invention.

FIG. 7A shows the first wiring pattern 118 and the second wiring pattern 120 disposed on the array substrate 150. The first wiring pattern 118 and the second wiring pattern 120 are disposed in the peripheral region 114. The first wiring pattern 118 includes a first wiring 119 that connects the scanning signal line drive circuit 106 and the scanning signal line 107. The second wiring pattern 120 includes a second wiring 121 having a common potential.

The first wirings 119 are arranged appropriately according to the number of scanning signal lines 107. FIG. 7A shows the first wirings 119-1, 119-2, 119-3, 119-4, 119-5 as an example. Focusing on the first wiring 119-1, as shown in the inserted enlarged figure, the first wiring 119-1 has a first straight portion 11901 extending in the direction D1, a second straight portion 11902 extending in the direction D2, and a bend portion 11903 connecting the first straight portion 11901 and the second straight portion 11902. The first straight portions 11901 and the second straight portions 11902 are divided into a plurality of portions, which are connected by a plurality of bending portions 11903. The second straight line portions 11902 disposed along the direction D2 are displaced toward the display region 112 by being connected by bending portions 11903 across the first straight line portions 11901, and are finally connected to the scanning signal lines 107 that extend continuously from the first straight line portions 11901 by the bending portions 11903. The first wiring 119-1, which has such a continuous structure, has a pattern that bends like a staircase. The first wirings 119-2, 119-3, 119-4, which are located inside (on the display region 112 side) from the first wiring 119-1, have the same structure. As shown by the first wiring 119-5, depending on the relative positions of the first straight portion 11901, the second straight portion 11902, and the scanning signal line 107, they may be connected by the bending portion 11903 without having a stair-like step pattern.

The first wirings 119-1, 119-2, 119-3, 119-4, 119-5 are disposed so that the staircase-like stepped portions are arranged along a direction parallel to the direction D1. FIG. 7A shows that the first wiring 119-1 is the outermost wiring of the first wiring pattern 118, and thus the first wiring pattern 118 has a staircase-like stepped shape in a part of its contour.

The second wiring 121 of the second wiring pattern 120 has the same shape as the first wiring. FIG. 7A shows the second wirings 121-1, 121-2, 121-3, 121-4, 121-5 as examples, which are interconnected. The second wiring pattern 120 includes the second wiring 121 having two-fold symmetry (180 degree rotation) with the first wiring 119, and the second wiring pattern 120 has a staircase-like stepped shape in a part of its contour. The first wiring pattern 118 and the second wiring pattern 120 are arranged so that the contour portions having the stair-step shape are adjacent to each other in a plan view.

As shown in FIG. 7A, the second straight portions 11902 of the first wirings 119-1, 119-2, 119-3, 119-4, 119-5 and the second wirings 121-1, 121-2, 121-3, 121-4, 121-5 corresponding to the second straight portions are arranged in a straight line along the direction D2. Then, the staircase-like stepped portions of the first wirings 119-1, 119-2, 119-3, 119-4, 119-5 and the second wirings 121-1, 121-2, 121-3, 121-4, 121-5 corresponding to the staircase-shaped stepped portions are disposed so that they are arranged along a direction parallel to the direction D1. Although the wirings constituting the first wiring pattern 118 and the second wiring pattern 120 are not interconnected in the directions D1 and D2, they can be seen as having a grid pattern from a bird's-eye view.

FIG. 7B shows the pattern of the light shielding layer 160 on the counter substrate 152. As described with reference to FIG. 5, the light shielding layer 160 has a first grid pattern and a second grid pattern in the display region 112 and the peripheral region 114. The second grid pattern of the light shielding layer 160 is disposed so that it overlaps the first wiring 119 forming the first wiring pattern 118 and the second wiring 121 forming the second wiring pattern 120. The light shielding layer 160 can shield the first wiring pattern 118 and the second wiring pattern 120 formed with a metal film in the peripheral region 114. The light shielding layer 160 has the second grid pattern, which allows the aperture ratio of the light shielding layer 160 (the ratio of regions in the display region and peripheral region that transmit light) to be the same or close to the same value in the display region 112 and the peripheral region 114. Thereby, there can be no difference in transparency between the display region 112 and the peripheral region 114, and these two regions can be distinguished and not be visible.

FIG. 7C is a cross-sectional view of the peripheral region 114 and shows the cross-sectional structure of the first wiring pattern 118. As shown in FIG. 7C, the first wiring 119 on the array substrate 150 side is formed by the first conductive layer 171 and the second conductive layer 174. Although the first insulating layer 172 is disposed between the first conductive layer 171 and the second conductive layer 174, the first conductive layer 171 and the second conductive layer 174 may be interconnected by a contact hole at any position not shown in the figure.

The first wiring 119 is embedded by the planarization layer 178, and the first transparent conductive layer 180 is disposed as a shield layer thereon. The first transparent conductive layer 180 is disposed to spread over the entire area where the first wiring pattern 118 and the second wiring pattern 120 are disposed. The fourth conductive layer 181 is disposed in contact with the first transparent conductive layer 180. Although not shown in FIG. 7C, the fourth conductive layer 181 has a grid pattern overlapping the first wiring 119. The fourth conductive layer 181 may also have a grid pattern that overlaps the second grid pattern of the light shielding layer 160. The fourth conductive layer 181 is disposed in contact with the first transparent conductive layer 180, which is disposed as a shielding layer, and functions as auxiliary wiring to reduce the resistance loss of the shielding layer.

The light shielding layer 160 on the side of the counter substrate 152 overlaps the first wiring 119. The counter electrode 162 is disposed to cover the light shielding layer 160. Since the peripheral region 114 is not a display region for images, the counter electrode 162 is not essential, however, since it is provided in the same manner as the display region 112, it is possible to ensure that there is no difference in transparency (or transmittance) between the display region 112 and the peripheral region 114. The liquid crystal layer 126 of the peripheral region 114 is sandwiched between the first transparent conductive layer 180 as a shield layer and the counter electrode 162, since the first transparent conductive layer 180 and the counter electrode 162 are fixed at a constant potential, the orientation state of the liquid crystal layer 126 is not affected and the non-scattering state (transparent) can be maintained.

In the peripheral region 114 of the transparent display, the first wiring 119 (wiring which connects the scanning signal line drive circuit 106 to the scanning signal line 107) forming the first wiring pattern 118 is formed with wiring portions extending in the first direction (direction D1) and in the second direction (direction D2), and the second wiring 121 (common wiring) forming the second wiring pattern 120 is formed with wiring portions extending in the first direction (direction D1) and wiring portions extending in the second direction (direction D2), a wiring pattern similar to the wiring group (scanning signal line 107) extending in the first direction and the wiring group (data signal line 109) extending in the second direction can be formed as in the display region 112, so that it is possible to ensure that there is no difference in appearance (transparency) between the display region 112 and the peripheral region 114 in terms of reflection of ambient light.

It is possible to make the boundary between the routed wiring of the scanning signal line 107 and the common wiring inconspicuous by forming the first wiring pattern 118 and the second wiring pattern 120 in the same pattern. It is possible to make sure that there is no difference in visibility (transparency) between the display region 112 and the peripheral region 114 by arranging a light shielding layer 160 having a grid pattern in both the display region 112 and the peripheral region 114.

Second Embodiment

This embodiment shows a different structure of the peripheral region 114 in the display device 100 shown in the first embodiment.

Figure 8A:
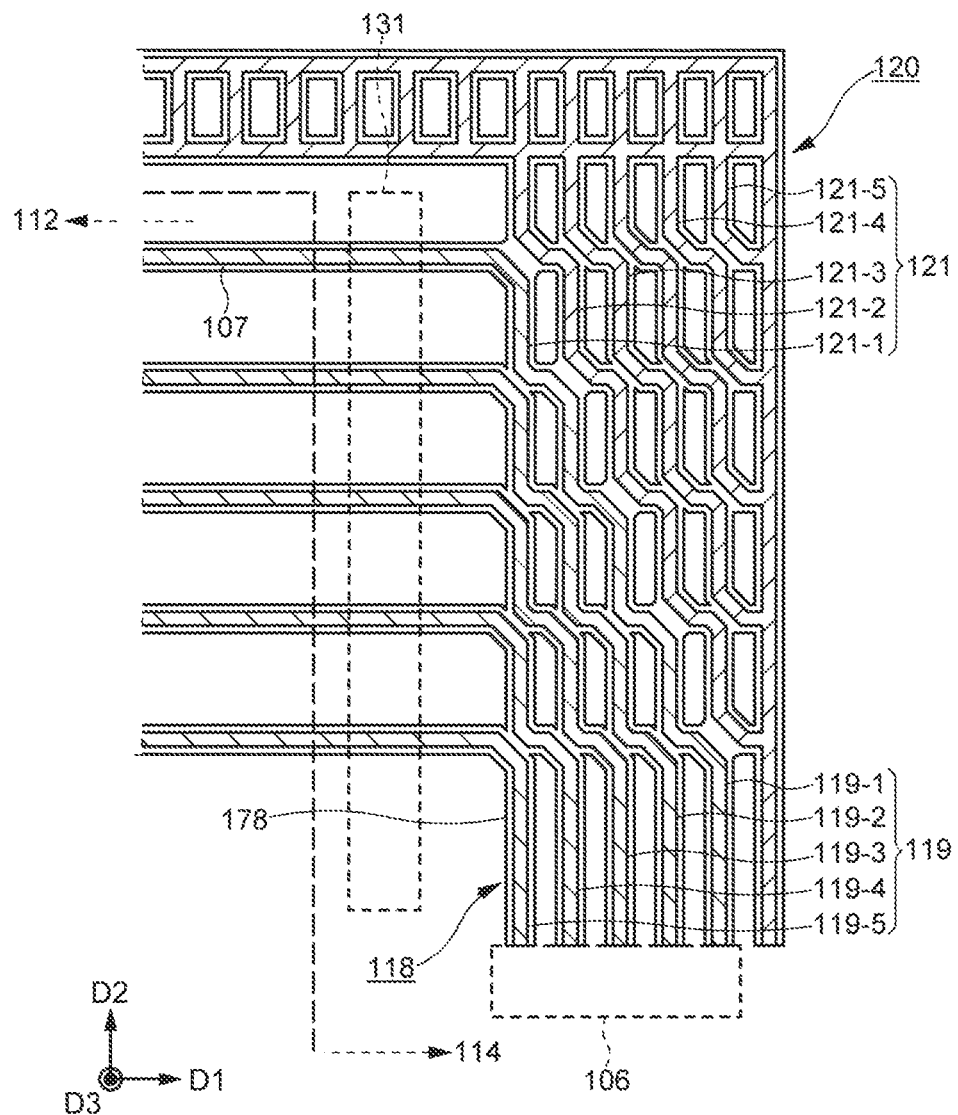
FIG. 8A is a plan view of wiring and a planarization layer disposed in a peripheral region of a display device according to an embodiment of the invention.
Figure 8B:
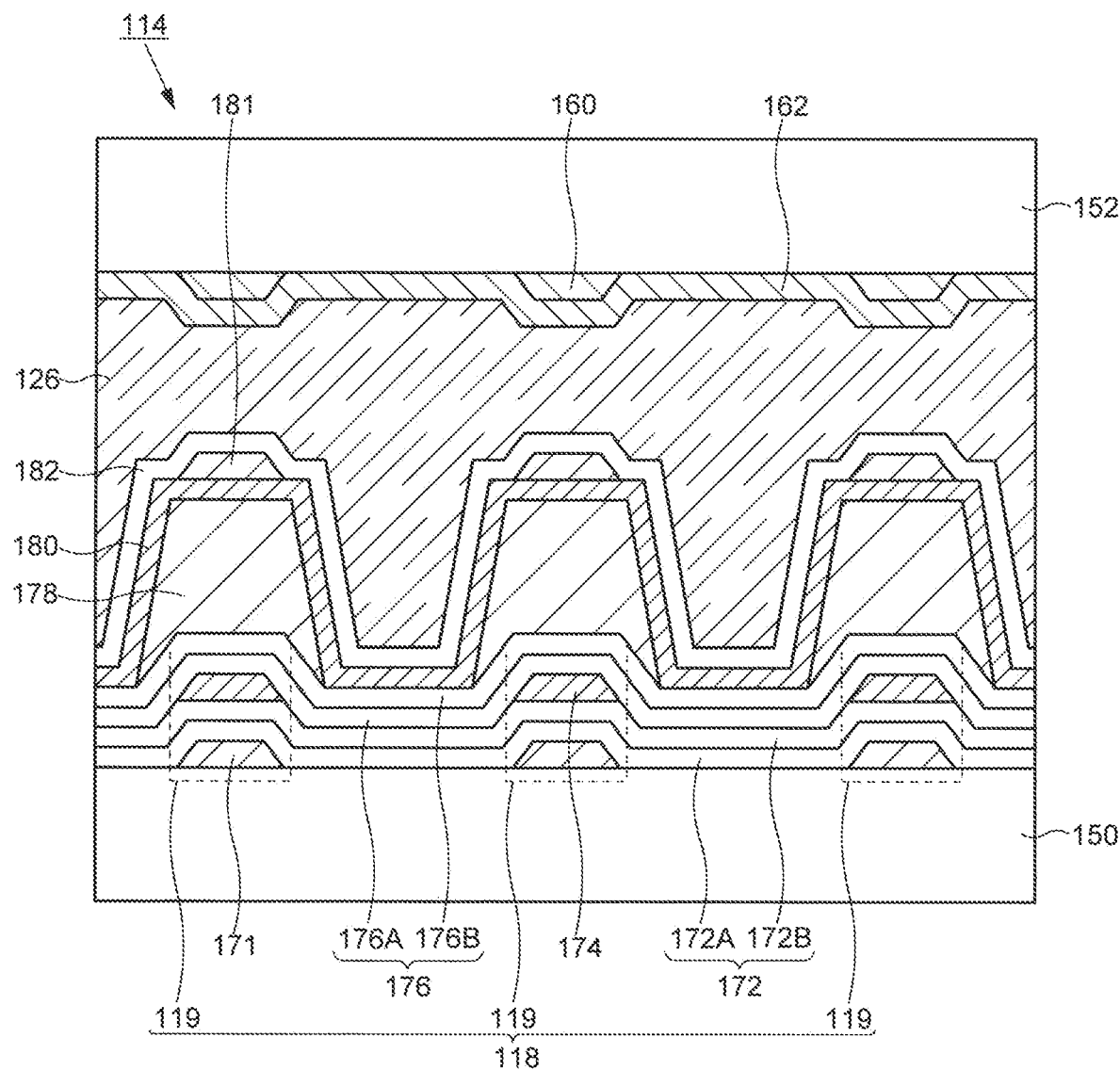
FIG. 8B is a cross-sectional view showing a configuration of wiring, a planarization layer and a light shielding layer disposed in a peripheral region of a display device according to an embodiment of the present invention.

FIG. 8A shows a plan view of the first wiring pattern 118 and the second wiring pattern 120 disposed on the array substrate 150, and FIG. 8B shows a cross-sectional view of the peripheral region 114. The first wiring pattern 118 and the second wiring pattern 120 have a similar structure as in the first embodiment. The first wiring 119 and the second wiring 121 are disposed on the planarization layer 178, but the planarization layer around them is removed. As shown in FIG. 8A, in the peripheral region 114, the planarization layer 178 in the region surrounded by the first wiring 119 (119-1 to 119-5) and the second wiring 121 (121-1 to 121-5) is removed. As shown in FIG. 8B, the first transparent conductive layer 180 covers the top and sides of the planarization layer 178 and is disposed along the top surface of the second insulating layer 176 in the area where the planarization layer is removed.

Figure 9:
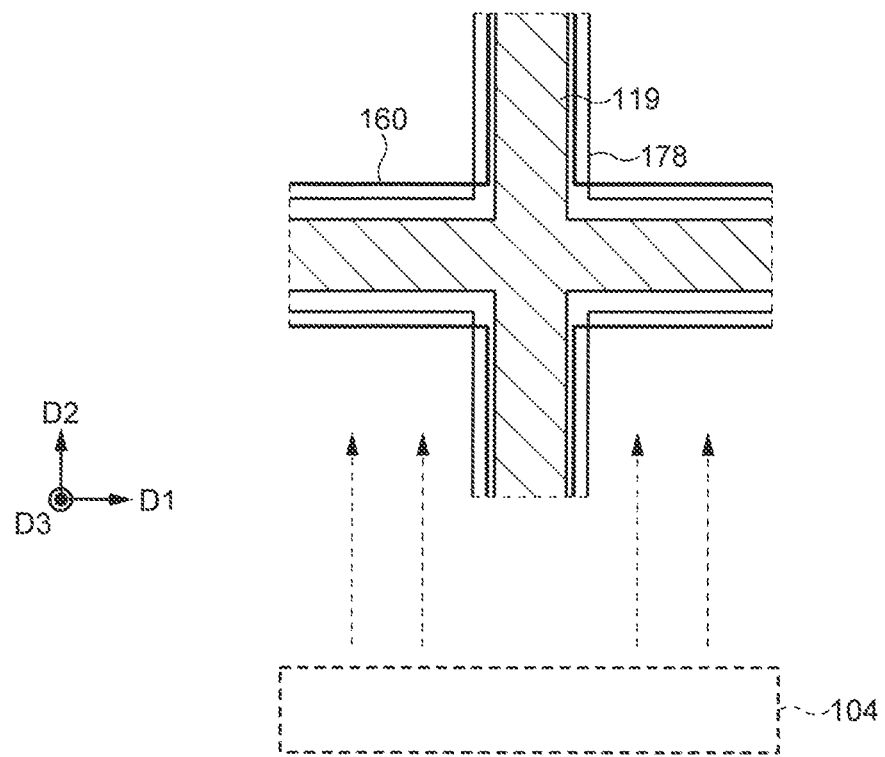
FIG. 9 is a plan view showing a configuration of wiring, a planarization layer and a light shielding layer disposed in a peripheral region of a display device according to an embodiment of the present invention.

As described in FIG. 1 and FIG. 2, light emitted from the light source 104 is incident from the side of the counter substrate 152. Here, as shown in FIG. 9, when light is emitted from the light source 104 in the direction D2, if the planarization layer 178 between the wirings is removed, there is concern that light may scatter at the edges, causing light leakage. FIG. 9 shows a structure in which the first wiring 119 is arranged in the directions D1 and D2. Corresponding to the pattern of such wiring, the planarization layer 178 also has a pattern removed along the directions D1 and D2. In this case, the portion of the pattern of the planarization layer 178 that extends parallel to the direction D2 is parallel to the direction of the light emitted from the light source 104, so there is no effect of scattering at the edges. On the other hand, the portion of the pattern of the planarization layer 178 that extends in the direction that intersects the direction D2 (direction D1) intersects the direction of the light emitted from the light source 104, so there is concern about the effect of scattering at the edges.

To solve this problem, as shown in FIG. 9, the pattern of the light shielding layer 160 is different between the portion extending in the direction D1 and the portion extending in the direction D2. That is, the pattern of the light shielding layer 160 is wider in the portion extending in the direction D1 relative to the portion extending in the direction D2. Specifically, the portion extending in the direction D1 is wider than the width of the planarization layer 178. It is possible to reduce the effect of light leakage by providing the width of the light shielding layer 160 extending in the direction D1 to cover the edges of the planarization layer 178. On the other hand, with respect to the direction D2, since the effect of scattering at the edge of the planarization layer 178 need not be considered, the light shielding layer 160 need only be wide enough to cover the first wiring 119, and the edge of the planarization layer 178 extending in the direction D2 may be exposed from the light shielding layer 160.

FIG. 9 is a schematic diagram, but as shown in FIG. 8A, the length of the first wiring 119 is shorter in the direction D1 than in the direction D2. Therefore, even if the width of the pattern extending in the direction D1 of the light shielding layer 160 is widened, the decrease in the aperture ratio is slight, rather, the narrower width of the pattern extending in the direction D2 is expected to improve the aperture ratio. Thus, even if the planarization layer 178 between the wirings is removed in the first wiring pattern 118 and the second wiring pattern 120, by making the pattern width of the light shielding layer 160 different in the direction D1 and direction D2, the aperture ratio of the light shielding layer 160 can be increased while preventing light leakage.

According to this embodiment, the peripheral region 114 has a region where the planarization layer 178 is partially removed, similar to the display region 112. This configuration can reduce the effect of light absorption by the planarization layer 178 in the peripheral region 114. Specifically, the planarization layer 178 reduces the optical absorption on the short wavelength side. Thereby, the difference in coloring between the display region 112 and the peripheral region 114 can be prevented from being seen, and the difference in transparency can be prevented. The display device 100 according to this embodiment has the same configuration as that in the first embodiment except that the planarization layer 178 is partially removed, and the same effects can be achieved.

Third Embodiment

This embodiment shows a different configuration of the first wiring 119 from that in the first embodiment.

Figure 10A:
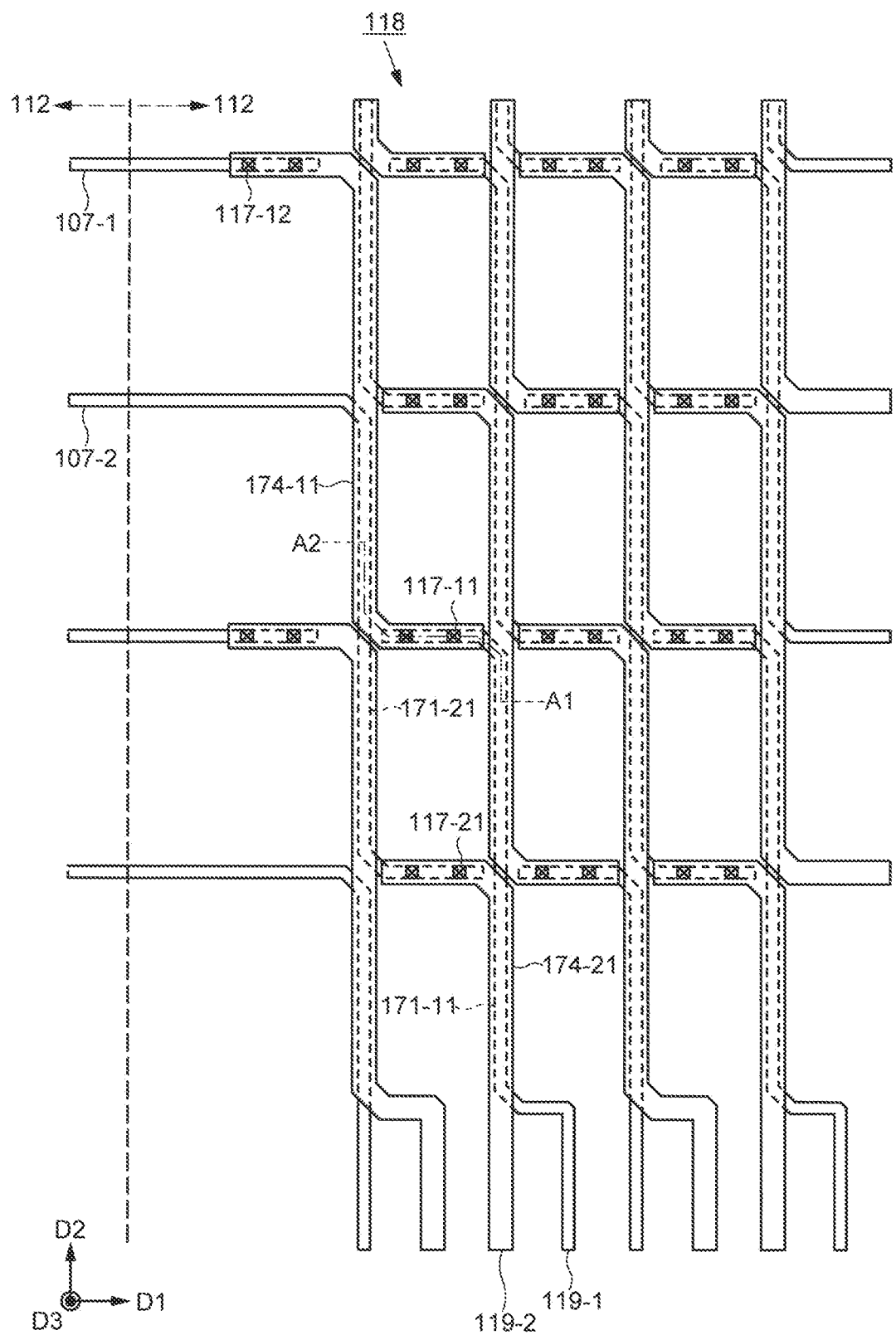
FIG. 10A is a plan view showing wiring patterns disposed in a peripheral area of a display device according to an embodiment of the present invention.

FIG. 10A shows the structure of the first wiring pattern 118 in this embodiment. In this embodiment, the first wiring 119 forming the first wiring pattern 118 has a structure in which portions of two wirings are overlapped using two conductive layers formed across the insulating layer. The two conductive layers can be, for example, the first conductive layer 171 and the second conductive layer 174 formed across the first insulating layer 172, as shown in FIG. 6.

Specifically, focusing on the first wiring 119-1 shown in FIG. 10A, the first wiring 119-1 is formed of a first wiring portion 171-11 formed by a first conductive layer and a second wiring portion 174-11 formed by a second conductive layer. The first wiring portion 171-11 and the second wiring portion 174-11 include a straight portion extending in the direction D2 and a portion bending from the straight portion and extending in the direction D1. The first wiring portion 171-11 and the second wiring portion 174-11 have a shape wherein the straight portion extending in the direction D2 is longer than the portion extending in the direction D1.

Figure 10B:
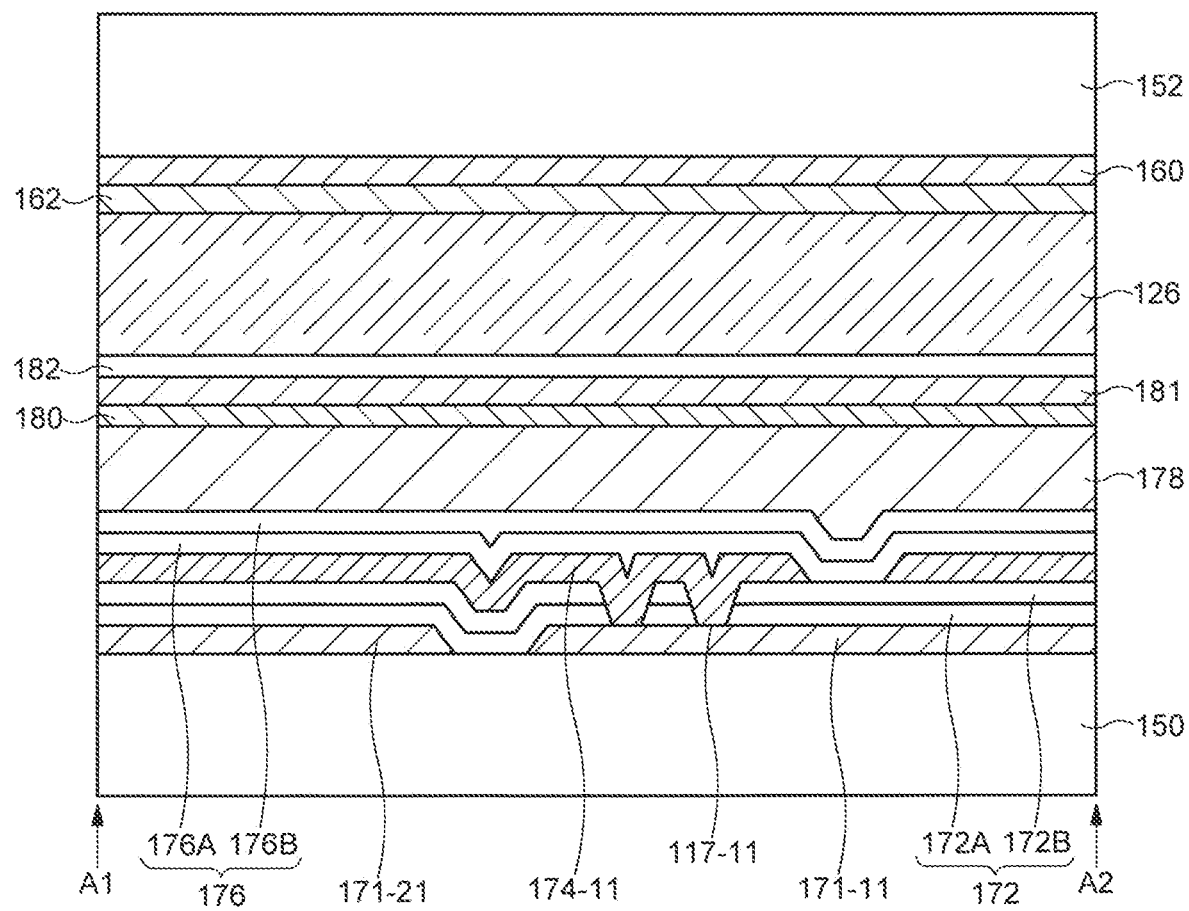
FIG. 10B is a cross-sectional view showing a structure along A1-A2 shown in FIG. 10A.

FIG. 10B shows the cross-sectional structure along the line A1-A2 shown in FIG. 10A. As shown in FIG. 10B, the first wiring portion 171-11 and the second wiring portion 174-11 are connected by a contact hole formed in first insulating layer 172 at a first connection portion 117-11 formed in a portion extending in the direction D1, which overlap each other. With this structure, the first wiring 119-1 electrically functions as a single wiring. The second wiring portion 174-11 has a second connection 117-12 to connect with the scanning signal line 107-1.

Turning to the first wiring 119-2 shown in FIG. 10A, the second wiring 119-2 is formed by a first wiring portion 174-21 formed by a second conductive layer and a second wiring portion 171-21 formed by a first conductive layer. The first wiring portion 174-21 and the second wiring portion 171-21 are connected at the third connection portion 117-21. With this structure, the first wiring 119-2 electrically functions as a single wiring. The first wiring 119-1 and the first wiring 119-2 overlap the first wiring portion 171-11 and the first wiring portion 174-21 in one portion, and the second wiring portion 174-11 and the second wiring portion 171-21 overlap in one portion.

It is possible to reduce the wiring density in a plan view even if the number of wirings constituting the first wiring pattern 118 is the same by providing a plurality of first wirings 119-1, 119-2 in such a way that the portions extending in the direction D2 overlap. As a result, the pattern of the portion of the light shielding layer 160 that extends in the direction D2 can be reduced and the aperture ratio can be increased. That is, since the peripheral region 114 has a higher wiring density than the display region 112, there is a concern that the light shielding layer 160 will have a lower aperture ratio, resulting in a decrease in transparency, however, by utilizing the configuration shown in this embodiment, the transparency of the peripheral region 114 can be increased so that there is no difference in transparency between the display region 112 and the peripheral region 114. As explained with reference to FIG. 10A, each of the first wirings 119-1, 119-2 is composed of a wiring portion formed by the first conductive layer and a wiring portion formed by the second conductive layer, and these wiring portions are arranged along the wiring line and connected alternately to equalize the wiring resistance. The capacitance formed between the wiring and the shield layer (transparent conductive layer 180) can also be made uniform between the wirings.

The first to third embodiments described above as embodiments of the present invention may be combined as appropriate, as long as they do not contradict each other. Also, based on the liquid crystal display device of each embodiment, those to which a person skilled in the art has made additions, deletions, or design changes of components as appropriate, or those to which processes have been added, omitted, or conditions have been changed, are also included in the scope of the invention as long as they have the gist of the invention.

It is understood that other effects that are different from the effects brought about by each of the embodiments described above, but that are obvious from the description herein or that can be easily predicted by a person skilled in the art, are naturally brought about by the present invention.

What is claimed is:

1. A display device, comprising:
   an array substrate including a display region with an array of pixels and a peripheral region outside the display region;
   a counter substrate opposite to the array substrate; and
   a liquid crystal layer between the array substrate and the counter substrate,
   wherein:
   the display region includes a plurality of data signal lines spaced apart in a first direction and a plurality of scanning signal lines spaced apart in a second direction intersecting the first direction,
   the peripheral region includes a first wiring pattern arranged with a plurality of wirings connected to each of the plurality of scanning signal lines and a second wiring pattern applied with a certain potential,
   the first wiring pattern includes a first straight portion extending along the first direction, a second straight portion extending along the second direction, and a bending portion connecting the first straight portion and the second straight portion, and the bending portion includes a first wiring having a staircase-like stepped shape,
   the second wiring pattern includes a second wiring having two-fold symmetry (180 degree rotation) with the first wiring, and
   the first wiring pattern and the second wiring pattern have stepped contour portions formed by the bending portions in a plan view, and the contour portions are adjacent to each other in a relative manner.

2. The display device according to claim 1, wherein the counter substrate includes a light shielding layer, wherein the light shielding layer comprises:
   a first grid pattern overlapping the plurality of data signal lines and the plurality of scanning signal lines in the display region, and
   a second grid pattern overlapping the first wiring pattern and the second wiring pattern in the peripheral region.

3. The display device according to claim 2, wherein the first grid pattern and the second grid pattern are continuous.

4. The display device according to claim 3, wherein the array substrate includes a planarization layer, and wherein the first wiring pattern and the second wiring pattern are disposed on the planarization layer.

5. The display device according to claim 4, wherein the first wiring and the second wiring are disposed on the planarization layer, and wherein the planarization layer around the first and second wiring are removed.

6. The display device according to claim 5, further comprising a light source disposed along the first direction and emitting light from a side surface of the counter substrate in the second direction,
   wherein a width of the pattern along the first direction of the second grid pattern is wider than a width of the pattern along the second direction of the second grid pattern.

7. The display device according to claim 1, wherein:
   the first wiring comprises a first wiring portion including a first conductive layer and a second wiring portion including a second conductive layer,
   the insulating layer is disposed between the first conductive layer and the second conductive layer, and
   the first wiring portion and the second wiring portion are connected via a contact hole in the insulating layer.

8. The display device according to claim 7, wherein the first wiring portion and the second wiring portion are a first straight portion extending along the first direction and a second straight portion extending along the second direction, respectively.

9. The display device according to claim 8, wherein a connecting portion between the first wiring portion and the second wiring portion is disposed in the first straight line portion.

10. The display device according to claim 1, wherein the liquid crystal layer is a polymer-dispersed liquid crystal.

* * * * *